United States Patent [19]

Strowik et al.

[11] 4,159,815
[45] Jul. 3, 1979

[54] ARRANGEMENT FOR FINE-ADJUSTING THE LONGITUDINAL POSITION OF A VEHICLE SEAT

[75] Inventors: Willibald Strowik, Remscheid-Lennep; Paul Werner, Remscheid, both of Fed. Rep. of Germany

[73] Assignee: Keiper Automobiltechnik GmbH & Co KG, Remscheid-Lennep, Fed. Rep. of Germany

[21] Appl. No.: 861,015

[22] Filed: Dec. 15, 1977

[30] Foreign Application Priority Data

Dec. 17, 1976 [DE] Fed. Rep. of Germany ....... 2657181

[51] Int. Cl.² .......................................... F16M 13/00
[52] U.S. Cl. ..................................... 248/429; 74/530
[58] Field of Search ............... 248/429, 372, 393, 394, 248/420; 74/411.5, 412 TA, 530, 529, 541

[56] References Cited

U.S. PATENT DOCUMENTS

| 812,216 | 2/1906 | Lorimer | 74/530 |
|---|---|---|---|
| 2,275,656 | 3/1942 | Saunders | 248/429 |
| 2,429,017 | 10/1947 | De Rose | 248/429 |
| 2,726,621 | 12/1955 | Hill | 74/530 |
| 2,953,190 | 9/1960 | Tanaka | 248/429 |

Primary Examiner—Albert A. Hafer
Attorney, Agent, or Firm—Michael J. Striker

[57] ABSTRACT

An adjustable seat is mounted on a base for adjustment of its position longitudinally of a motor vehicle, by means of two guiding arrangements, each located at one side of the seat and each including a front guide track and a rear guide track. The seat is arrestable in a multitude of adjusted positions by at least one arresting mechanism which includes a rack mounted on the base, a pinion mounted on the seat for rotation in mesh with the rack, a ratchet connected to the pinion for joint rotation therewith, and a pawl displaceably mounted on the seat and engaging the ratchet to arrest the seat in any selected one of the multitude of adjusted positions. The rack may extend parallel to one of the guide tracks and then a support member which supports the seat on this guide track may be mounted coaxially with the pinion. Another such arresting mechanism may be arranged at the opposite side of the seat from the above arresting mechanism, and a shaft may interconnect the pawl of the two arresting mechanism for simultaneous displacement.

11 Claims, 6 Drawing Figures

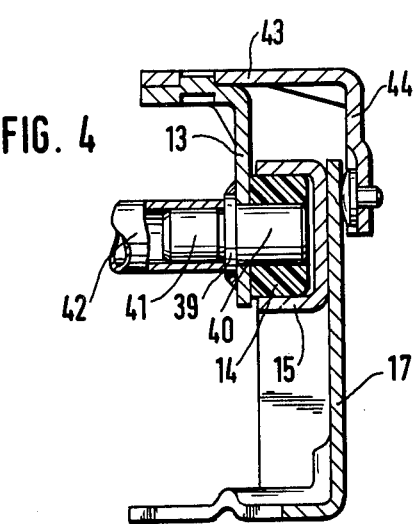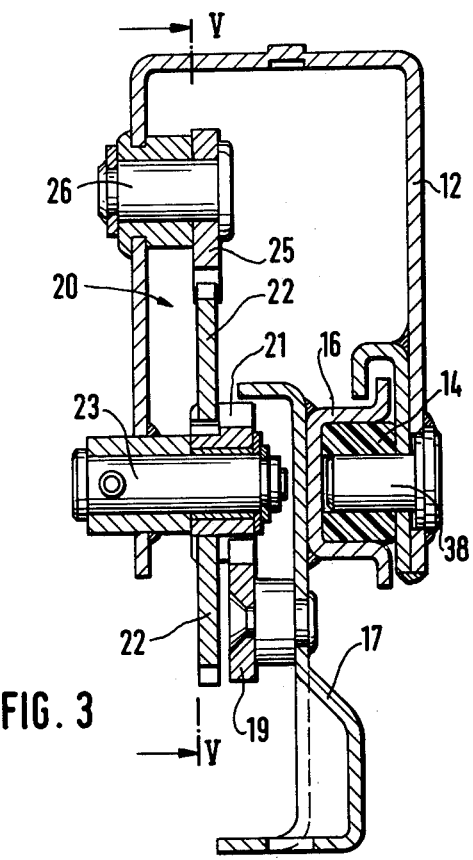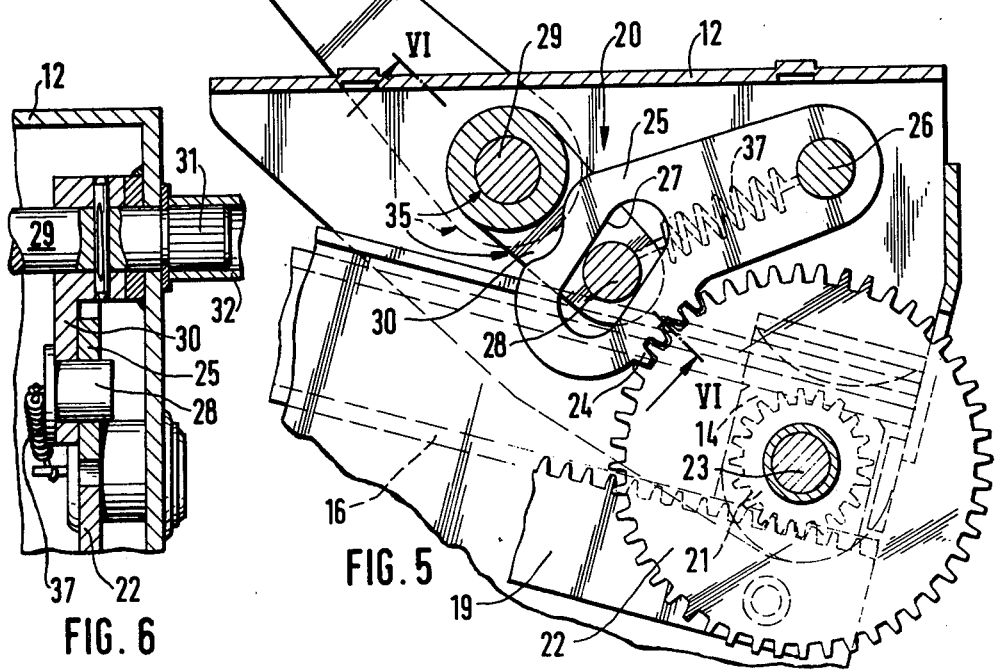

ARRANGEMENT FOR FINE-ADJUSTING THE LONGITUDINAL POSITION OF A VEHICLE SEAT

BACKGROUND OF THE INVENTION

The present invention relates to a seat in general, and more particularly to an adjustable seat for use in motor vehicles. Even more particularly, the present invention relates to an arresting arrangement which blocks the seat in a multitude of adjusted positions.

Many constructions of adjustable seats for motor vehicles are already known and in widespread use. Among others, there is also already known a construction of the adjustable seat wherein the seat proper is mounted, at each of its sides, on a guiding arrangement which consists of a front guide track and a rear guide track each of which has different inclination with respect to the horizontal. Support elements contact the guide tracks of the two guiding arrangements and thus support the seat proper on the respective guide tracks for displacement longitudinally thereof and thus frontwardly or rearwardly relative to the motor vehicle in which the adjustable seat and the guiding arrangements thereof are mounted. It is also already known to arrange an arresting mechanism in the region of at least one of the guide tracks, the arresting mechanism serving to block the seat proper in a plurality of adjusted positions.

An adjustable seat of this construction is known, for instance, from the German Pat. No. 766,073, wherein the rear guide track of each of the guiding arrangements encloses a larger acute angle with the horizontal than the front guide track. The seat is equipped with a rotatable roller for each of the guide tracks, the respective roller being in a rolling contact with the respective associated guide track and thus supporting the seat on the latter for displacement longitudinally thereof. The two rollers which are arranged at the front region of the seat are mounted on hollow axles, and spring-biased arresting bolts are displaceably mounted in the hollow axles. In its arresting position, each of the arresting bolts extends into an opening of a row of openings which is provided in the support of each of the guide tracks arranged at the front region of the seat. The arresting bolts can be brought out of engagement by links or ropes actuated by a hand-operated lever so that the seat of the motor vehicle can be displaced on the guide tracks subsequent to such a release. Because of the inclination of the guide tracks, the longitudinal displacement of the seat is accompanied by an adjustment of its elevation as well as an adjustment of its inclination.

This conventional arrangement is disadvantageous in many respects. First of all, the guide tracks are relatively short so that only a small adjustment range of the seat can be utilized. Moreover, the seat can only be arrested in a limited number of adjusted positions, the number corresponding to the number of the above-mentioned openings of the row of openings, and at spacings corresponding to the distances of the openings from one another. Inasmuch as these distances of the openings are predetermined by the dimensions of the arresting bolts which, in turn, are determined by the calculations of static requirements, on the one hand, and by the cross-sections of the supports for the guide tracks, on the other hand, a fine adjustment of the seat in each desired seat position is impossible. In addition thereto, it is very difficult if not impossible with this arresting arrangement to arrest the seat in a desired position, particularly when the adjustment of the seat position is accomplished rapidly.

SUMMARY OF THE INVENTION

Accordingly, it is a general object of the present invention to avoid the disadvantages of the prior art.

More particularly, it is an object of the present invention to so design an arresting mechanism for a longitudinally adjustable seat as to be capable of arresting the adjustable seat in a considerable number of longitudinally displaced positions.

Another object of the invention is to develop an arresting mechanism for the adjustable seat which renders it possible to exactly and reliably arrest the adjustable seat in the selected position, regardless of the speed of adjustment of the seat and carefulness of the user of the seat.

A concomitant object of the present invention is to so construct the arresting mechanism as to be simple in construction, easy to handle, inexpensive to manufacture and assemble, and reliable in operation nevertheless.

In pursuance of these objects and others which will become apparent hereafter, one feature of the present invention resides, briefly stated, in an adjustable seat, particularly for use in motor vehicles, which comprises a seat component having front, rear and lateral portions; a base component; means for mounting said seat component on said base component for frontward and rearward adjustment relative thereto within an adjustment range, including a pair of guiding arrangements each extending along one of said lateral portions of said seat component and each including a front guide track and a rear guide track, and support members mounted on said seat component and respectively engaging said guide tracks to support said seat component thereon; and means for arresting said seat component in a multitude of adjusted positions relative to said base component within said adjustment range, including at least one rack rigid with one of said components, a pinion rotatably mounted on the other of said components and meshing with said rack in said adjustment range, a ratchet connected to said pinion for joint rotation therewith, a pawl displaceably mounted on said other component, and means for displacing said pawl between an arresting position in which said pawl engages, and a releasing position in which said pawl is disengaged from, said ratchet.

By constructing the adjustable seat in the above-discussed manner, it is possible to achieve a spacing of the various arresting positions which is only in the order of magnitude of one millimeter, particularly when the ratchet is formed with a large, and the pinion with a small, number of teeth. For practical purposes, an adjustment of this resolution can be considered as quasi stepless. Furthermore, it is possible to use a pawl which, in order to obtain the desired blocking safety with respect to accident-caused impact loading, has a large number of teeth which engage those of the ratchet.

The present invention can be realized in a variety of ways. In an advantageous embodiment of the present invention, the displacing means includes an actuating lever which is mounted on said other component and operatively connected to said pawl. Advantageously, each of said pawl and said actuating lever has a connecting region and the displacing means further includes a curved connecting surface at one of said connecting regions and a pin rigid with the other of said connecting regions and contacting said connecting surface of said one connecting region to displace said pawl in response to the actuation of said lever. In this embodiment, it is further advantageous when said pawl is mounted on said other component by a pivot, and when a spring permanently urges said pawl toward said arresting position thereof.

In order for the arresting arrangement to be able to withstand, with the required safety margin, the high acceleration-attributable forces which act on the seat particularly during accidental collisions of the motor vehicles equipped with the arresting mechanisms of the present invention, it is particularly advantageous when the above-discussed arresting means is arranged at one of said guiding arrangements, and another arresting means of the same type is arranged at the other of the guiding arrangements, a shaft interconnecting the levers of both of the arresting means for transmission of motion therebetween. It is especially advantageous when the shaft includes a stub shaft for and jointly rotatable with each of said levers of said arresting means associated with the guiding arrangements, respectively, and a tubular connecting member mounted on said stub shafts for joint rotation therewith. According to another aspect of the present invention, each of the levers for the two arresting means includes one arm connected to the respective pawl, only one of said levers also including another arm configured as a handle.

In order to make the assembling of the seat and of the arresting mechanism thereof as easy as possible, and in order to simplify the mounting of the arresting mechanism on the seat, it is further proposed by the present invention to use said seat component as the above-mentioned other component, and to equip it with a bifurcated support element for and embracing said ratchet and pinion of the respective arresting means.

In this connection, it is further advantageous when each of said arresting means includes a mounting shaft which mounts said ratchet and pinion thereof on the respective support element and has an end portion which extends beyond the latter, one of the support members of each of said guiding arrangements being coaxial with said mounting shaft. As a result of the coaxial arrangement of the pinions and of the associated support members of the two guiding arrangements, no moments, which would otherwise come into existence if the axes of the pinions and of the associated support members were offset, and thus no forces which would increase the friction between the support members and the guide tracks, can come into existence so that, when it is attempted to adjust the position of the seat component, only the friction attributable to the weight of the seat and the loading of the seat by the user thereof need be overcome.

It is particularly advantageous when the above-discussed arresting means extend respectively parallel to said rear guide tracks of said guiding arrangements and said one support member of each of said guiding arrangements engages said rear guide tracks. Then, another of said support members of each of said guiding arrangements includes a mounting member rigid with said seat component, and an engaging member mounted on said mounting member and engaging said front guide track of the respective guiding arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a sectional view of the rear portion of the support element and the associated guide track at one lateral portion of the seat taken on line III—III of FIG. 1;

FIG. 4 is a sectional view of the front of the support element with the associated guide track on one side of the seat, taken on line IV—IV of FIG. 1;

FIG. 5 is a longitudinal sectional view of the rear of the support element together with a portion of a guide track and with a lever, taken on line V—V of FIG. 3; and FIG. 6 is a partial sectional view of the arresting mechanism taken on line VI—VI of FIG. 5.

DESCRIPTION OF THE PREFERRED EMBODIMENTS

Figure 1:
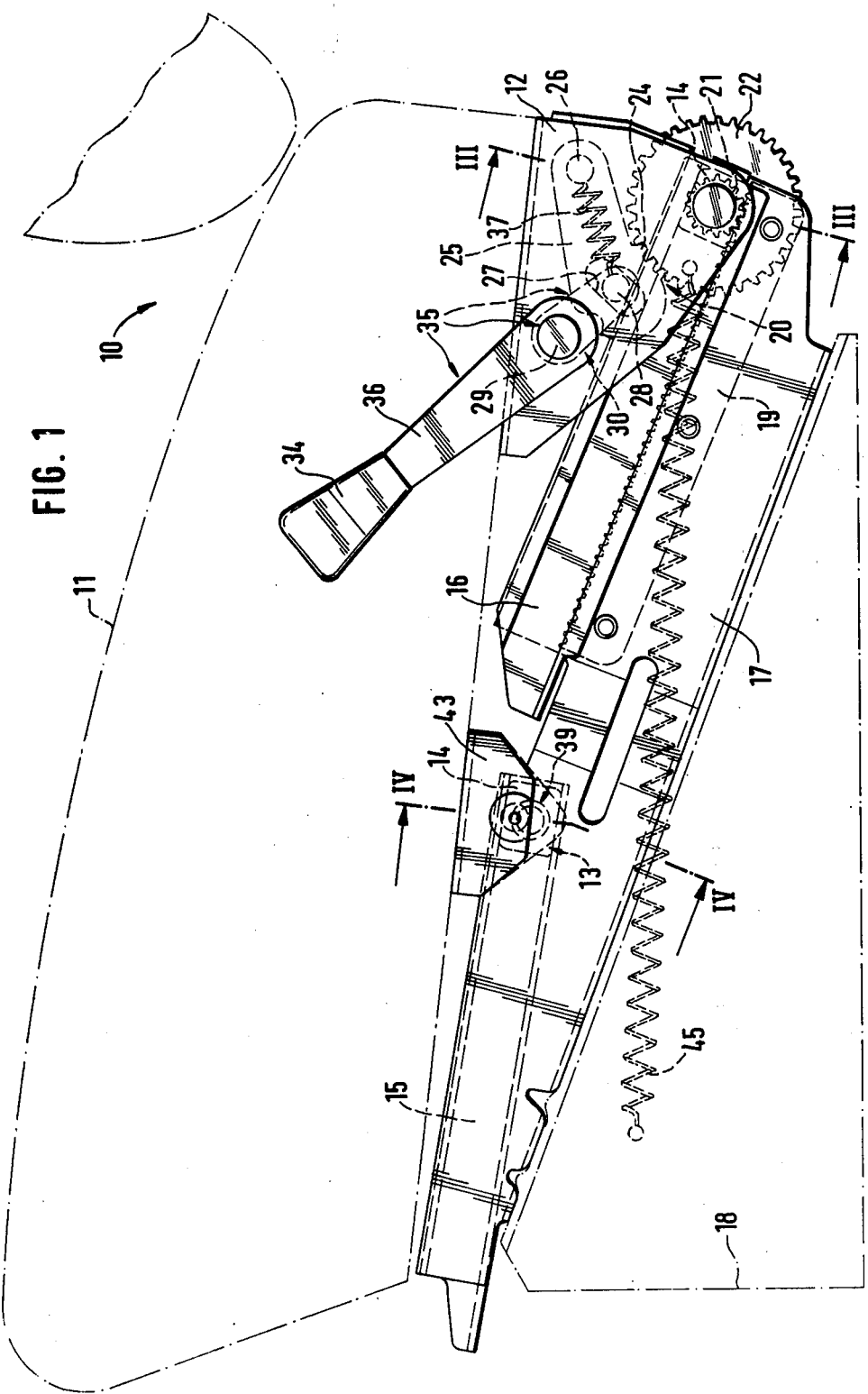
FIG. 1 is a side-elevational view of a guiding arrangement and a support element for an adjustable seat for use in motor vehicles, wherein the seat component proper has been indicated only in phantom lines.
Figure 2:
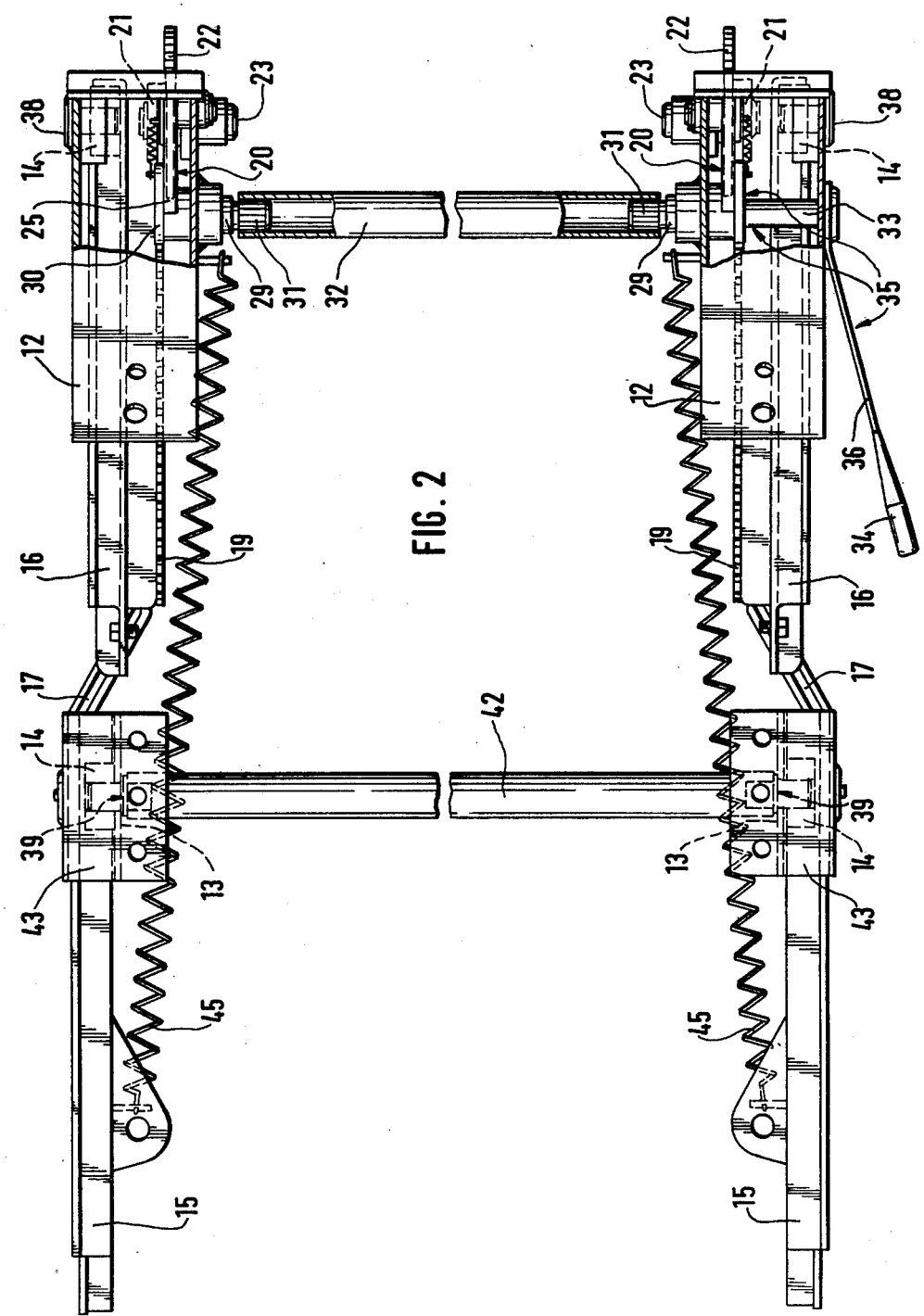
FIG. 2 is a partially sectioned top plan view of the arrangement of FIG. 1.

Referring now to the drawing in detail, and first to FIG. 1 thereof, it may be seen that reference numeral 10 has been used to designate the only indicated seat component in toto. The seat component 10 is provided, at each of its longitudinally extending lateral portions, and at its rear region, with a support element 12 which is connected with the seat proper 11. At each of the longitudinally extending lateral sides, and in the central region, of the seat 11, there is provided a support block 13 which is rigidly connected to the seat 11. A support member 14 is rotatably mounted on each of the support elements 12 and also on each of the support blocks 13. The support members 14 which are mounted on the support block 13 engage a guide track 15 which is arranged at the front portion of the seat 11, encloses an angle with the horizontal, and rises in the frontward direction. On the other hand, the support members 14 which are rotatably connected to the support element 12 engage a rear guide track 16 which is arranged at the rear portion of the seat 11, is also inclined with respect to the horizontal, also rises in the frontward direction, but to a greater extent than the front guide track 15. The guide tracks 15 and 16 which are arranged behind one another are slidably supported at each of the lateral portions of the seat 11 by a stationary base which includes a carrier rail 17 which is offset in its central region, and defines a front guiding region rising in the frontward direction about an angle, to support the front guide track 15, and a rear guiding region rising in the frontward direction about a larger angle and supporting the rear guide track 16. Each of these carrier rails 17 is held in place at each of the lateral portions of the seat 11 by a bracket 18 which is connected to the floor of the motor vehicle and which is illustrated in FIG. 1 in dash-dotted lines.

In the illustrated embodiment, an arresting mechanism for arresting the seat 11 in a multitude of different adjust positions includes a toothed rack 19 which is arranged at the frontwardly and upwardly inclined rear guide track 16 and extends parallel to the same. The rack 19 is provided at each of the lateral portions of the seat 11 and is rigidly connected to the respective carrier rail 17, and a blocking arrangement 20 which is arranged in the support element 12 cooperates with the rack 19.

The blocking arrangement 20 includes a pinion 21 which meshes with the toothed rack 19, the pinion 21 being connected to a ratchet 22 for joint rotation therewith. The pinion 21 together with the ratchet 22 are commonly rotatably supported on an axle 23 which is mounted in the support element 12 in a cantilevered fashion. Blocking teeth 24 of a pawl 25 which, as illustrated, is constructed as a blocking lever, engage the teeth of the ratchet 22.

The blocking lever 25 which is mounted on the support element 12 for pivoting by a pivot 26, includes a control surface 27 at the region of its blocking teeth 24. In the illustrated embodiment, the control surface 27 is constituted by an elongated slot which extends at an angle with respect to the engagement location between the blocking teeth 24 of the blocking lever 25 and the teeth of the ratchet 22, the elongated slot being formed in the blocking lever 25. A control pin 28 engages the control surface 27, the control pin 28 being arranged at the lower end of the load arm 30 which is connected to a shaft 29 for joint rotation. The shaft 29 is provided at each of the lateral portions of the seat 11, being mounted in the respective support element 12. The shaft 29 has a pin-shaped portion 31 which extends beyond the side of the support element 12 which faces the other support element 12. The pin-shaped portions 31 of the shafts 29 are connected by a tubular member 32 with one another for joint rotation with each other so that the motion of one of the shafts 29 mounted in one of the support elements 12 is transmitted to the other shaft 29 mounted in the other support element 12, in an immediate manner and in the same sense.

While one of the shafts 29 in one of the two support elements 12 ends immediately behind the load arm 30, the other shaft 29 associated with the other seat support element 12 has an extension 33 which passes through the respective seat support element 12 and emerges at the outer side of the respective seat support element 12. At that location, the shaft 29 is connected to a handle 39 for joint rotation. The handle 34, together with the shafts 29 and the load arms 30 which are connected to the shafts 29 for joint rotation, form a two-arm lever 35 which has force arm 36 represented by the handle 34.

In order to assure that, when the handle 34 is released, the blocking teeth 24 of the blocking lever 25 will securely engage the teeth of the ratchet 22, a helical expansion spring 37, acting as an energy accumulator, is arranged between the pivot 26 and the control pin 28, the spring 37 urging the blocking lever 25, via the control pin 28, toward its arresting position.

A bolt 38 is rigidly connected to the seat support element 12, is coaxial with the axle 23 which carries the ratchet 22 and the pinion 21 which meshes with the toothed rack 19, and is arranged at the opposite side of the seat support member 12 from the axle 23. The rear support member 14, which is configured as a sliding member and which is preferably made of synthetic plastic material, is pivotably mounted on the bolt 38. This support member 14 slides in a hat-shaped profiled guide track 16 which is rigidly connected to the carrier rail 17 at the rear region thereof. As a result of this, the seat component 10 is retained at its both longitudinally extending lateral sides in the respective guide tracks 16.

As already mentioned before, the seat 11 proper is provided, at each of its lateral portions, with a bearing block 13. A bearing pin 39 is then rigidly connected with the respective bearing block 13. The bearing pin 39 has an outwardly extending portion 40, and an inwardly extending portion 41. While another of the above-mentioned support members 14, which is also configurated as a sliding body and which is also made of synthetic plastic material, is pivotably mounted on the outer portion 40 of the bearing pin 39, and engages in the guide track 15 which is inclined in the same direction as but which is less inclined to the horizontal than the rear guide track 16, the inner portion 41 of the bearing pin 39 supports a distancing tube 42 which keeps the opposite bearing blocks 13 at a distance from one another. In order to enhance the axial guidance of the seat 11, an angular piece 43 is rigidly connected with the bearing block 13 and has a shoulder 44 which laterally overlaps the carrier rail 17.

When the handle 34 is lifted, the control pin 28 cooperates with the control surface 27 to displace the blocking lever 24 out of engagement with the ratchet 22 so that the seat component 10, which is supported, in pairs, at four points in the guide tracks 15 and 16, can be shifted forwardly from the rearward terminal position which is illustrated in FIG. 1. During this adjusting displacement, the seat component 10 is simultaneously lifted as a result of the forward and upward inclination of the guide tracks 15 and 16, and also slightly tilted forwardly as a result of the higher inclination of the rear guide track 16 than that of the front guide track 15.

Inasmuch as the ratchet 22 can be provided with a considerable number of blocking teeth and thus may have a small division angle from one to the other of the teeth, and in view of the fact that there is present another reduction in the transmission between the ratchet 22 and the toothed rack 19, it is possible to achieve a fine resolution of the respective arresting position so that, for all intents and purposes, the seat component 10 can be arrested, after the release of the handle 34, in each of the possible positions of the seat component 10 between its terminal positions. In order for the seat component 10 not to immediately slide into the position, that is, the terminal position, illustrated in FIG. 1, as a result of the action of its own weight and of its loading by the user, equalizing springs 45 are arranged between the seat support elements 12 at the bearing blocks 13 and stationary points at the bracket 18, the springs 45 being expansion springs which act on the seat component 10 with a small force in the forward direction.

It will be understood that each of the elements described above, or two or more together, may also find a useful application in other types of constructions differing from the types described above.

While the invention has been illustrated and described as embodied in an arresting mechanism for an adjustable seat of a motor vehicle, it is not intended to be limited to the details shown, since various modifications and structural changes may be made without departing in any way from the spirit of the present invention. So, for instance, a pawl mounted for movement exclusively radially of the ratchet 22 could be used instead of the blocking lever 25. Then, this linearly displaceable pawl could be urged into its extended position, in which it would engage the ratchet 22, by a spring. An angular lever would then be used to displace the pawl towards its releasing retracted position. In addition thereto, it would also be possible to use rollers instead of the sliding support members 14. Furthermore, the equalizing springs 45 could be connected to stationary points on the carrier rails 17 instead of on the brackets 18.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An adjustable seat, particularly for use in motor vehicles, comprising a seat component having front, rear and lateral portions; a stationary base component including a front region rising at an angle with respect to the horizontal and a rear region rising at another angle with respect to the horizontal; means for mounting said seat component on said base component for frontward and rearward adjustment relative thereto within an adjustment range, including a pair of guiding arrangements each extending along one of said lateral portions of said seat component and each including a front guide track movably supported on said front region and a rear guide track movably supported on said rear region of said base component, and support members mounted on said seat component and respectively engaging said guide tracks to support said seat component thereon; and means for arresting said seat component in a multitude of adjusted positions relative to said base component within said adjustment range, including at least one rack rigid with said base component, a pinion rotatably mounted on said seat mounting means and meshing with said rack in said adjustment range, a ratchet connected to said pinion for joint rotation therewith, a pawl displaceably mounted on said seat mounting means, and means for displacing said pawl between an arresting position in which said pawl engages, and a releasing position in which said pawl is disengaged from, said ratchet.

2. An adjustable seat as defined in claim 1, wherein said other angle formed by said rear region of said base component is larger than the angle formed by said front region of said base component with respect to the horizontal.

3. An adjustable seat as defined in claim 1; and further comprising biasing means permanently urging said pawl toward said arresting position thereof.

4. An adjustable seat as defined in claim 1, wherein said displacing means includes an actuating lever mounted on said seat mounting means and operatively connected to said pawl.

5. An adjustable seat as defined in claim 4, wherein said pawl and said actuating lever each has a connecting region; and wherein said displacing means further includes a curved connecting surface at one of said connecting regions and a pin rigid with the other of said connecting regions and contacting said connecting surface of said one connecting region to displace said pawl in response to the actuation of said lever.

6. An adjustable seat as defined in claim 4, wherein said arresting means further includes a pivot which mounts said pawl on said other component.

7. An adjustable seat as defined in claim 4, wherein said arresting means is arranged at one of said guiding arrangements; further comprising another arresting means similar to said arresting means and arranged at the other of said guiding arrangements; and wherein said displacing means includes a shaft interconnecting said levers of both of said arresting means for transmission of motion therebetween.

8. An adjustable seat as defined in claim 7, wherein said shaft includes a stub shaft for and jointly rotatable with each of said levers of said arresting means and said other arresting means, respectively, and a tubular connecting member mounted on said stub shafts for joint rotation therewith.

9. An adjustable seat as defined in claim 7, wherein each of said levers of said arresting and other arresting means includes one arm connected to said pawl; and wherein only one of said levers also includes another arm configurated as a handle.

10. An adjustable seat as defined in claim 7, wherein said seat component has a bifurcated support element for and embracing said ratchet and pinion of the respective arresting means; wherein each of said arresting means includes a mounting shaft which mounts said ratchet and pinion thereof on the respective support element; and wherein one of said support members of each of said guiding arrangements is rigidly mounted on said support element across the latter from said mounting shaft.

11. An adjustable seat as defined in claim 10, wherein said racks of said arresting means extend respectively parallel to said rear guide tracks of said guiding arrangements and said one support member of each of said guiding arrangements engages said rear guide tracks; and wherein another of said support members of each of said guiding arrangements includes a mounting member rigid with said seat component, and an engaging member mounted on said mounting member and engaging said front guide track of the respective guiding arrangement.

* * * * *